Aug. 10, 1965 J. RABINOW 3,200,373

HANDWRITTEN CHARACTER READER

Filed Nov. 22, 1960

2 Sheets-Sheet 1

INVENTOR
JACOB RABINOW

BY Joseph A. Genovese

ATTORNEY

Aug. 10, 1965 J. RABINOW 3,200,373
HANDWRITTEN CHARACTER READER
Filed Nov. 22, 1960 2 Sheets-Sheet 2

INVENTOR
JACOB RABINOW
BY Joseph A. Genovese
ATTORNEY

United States Patent Office 3,200,373

Patented Aug. 10, 1965

3,200,373

HANDWRITTEN CHARACTER READER

Jacob Rabinow, Takoma Park, Md., assignor, by mesne assignments, to Control Data Corporation, Minneapolis, Minn., a corporation of Minnesota Filed Nov. 22, 1960, Ser. No. 71,094
3 Claims. (Cl. 340—146.3)

This invention relates to character recognition machines and particularly to machines and methods for identifying hand printed or handwritten characters.

The art of high-speed character identification has advanced to the point where a number of successful machines, embodying various techniques, have been constructed. However, the emphasis has been placed on identifying machine printed or typewritten characters. Identification of handwritten characters presents a more difficult problem since each character may be made in a number of ways, whereas machine printed and typewritten characters are repetitive, disregarding differences in font.

At the present state of the art it appears that some constraint must be placed upon the writer of handwritten characters to enable a reasonably simple machine to read the characters later. Several restraints have been suggested for numerals and a few alphabetic characters. One of the least difficult restraints to follow is the two dot system originally disclosed by Johnson's Patent No. 2,741,312. The beauty of this system is that it is very easy to learn to use and is adequate for numerals and a few alphabetic characters. This technique gives rise to a very simple method for later reading by simplified scanning. The Johnson patent shows means to read the characters by using conducting inks and contacting electrodes. My invention contemplates the extension of this technique not only to use optical readers, where non-contacting techniques can be employed but also the further development of this two dot principle by the addition of location marks to aid the machine to find each of the characters. All reading machines require that each character to be read is isolated from others, or at least fed into the logic in the machine in such a way that the characters preceding and following the one of interest do not confuse the issue. Generally speaking, in the case of printed characters, the space between the characters, and the determination of the "first black" (leading edge of the character) as the character is scanned determine the position of the character in the logic of the machine. In the case of handwritten numerals, the shape and size of characters can vary so widely that to depend on the "first black" to position the character would give rise to very great difficulties. The location of the two dots, if two dots are the constraint about which the characters are written, is very difficult. Dots which are of different color from the character can be used, and suitable color filters can be employed so that the dotes can be seen, or at least recognized, as separate from the character. This separate information can be used to position the character in a logic matrix such as that shown in J. Rabinow et al. U.S. patent application 32,911 or the logic of any machine can make use of the position of these colored dots. Two color reading is, however, expensive and difficult. Because the character begins before and may, in fact, surround the dots, the positioning information will not be available until after some parts of the character have been scanned. This does not mean that this positioning information cannot be used later, but it does give rise to many difficulties and a straight forward reading machine does not appear possible.

In order to overcome these difficulties in positioning, I use positioning marks which are printed on a sheet along with the two dots about which the character is going to be written. The dots may be any configuration, but small circles would be a good choice. Other writing restraints are disclosed so that the reading machines would have no difficulty in locating the unknown character and positioning it correctly in respect to the internal logic of the machine. A restraint which is suitable for hand printed numerals and characters is the "box" shown in the drawings which consists of a rectangular area surrounded by wide dark borders. The borders are sufficiently dark so that their user naturally keeps the character inside the "box" in order to see the character after he has written it. This is a constraint that is easy to use and if the "box" is made of appropriate size (which was found by experiment to be about ¼ in. high by $\frac{3}{16}$ in. wide), the user can be easily taught to write a reasonably sized character in it.

If we use the two dot system shown by Johnson, or the four dot system later disclosed by Diamond of Bell Laboratories, we do not need the dark box around the area on which the character is written, but we do need a reference mark in order to enable the reading machine to locate the character. The advantage of using such locating and constraining marks as I show is that single color printing can be used for the form sheet. There is an advantage, however, in printing the dots in a light color to which the photocells do not respond. For example, when I use silicone diodes as the detecting elements and print the dots with red ink the diodes respond to red approximately in the same manner as they do to white. This means that they do not see the dots. This is an advantage in that the signals of the scanning system are not affected by the dots. It is not too serious a problem if the dots are seen, because, as will be seen from the reading of this specification, the scanning system and the matrix system are so designed that the matrix lines which the character crosses are very well defined, and the dots fall on the intersections of the matrix lines and have no effect on the output.

The choice of the best area identifying marks is based to a large extent upon the habits of people in hand-printing numerals. For example, some people may form the numeral 9 with a long lower tail, while others may do it with a short tail or, in fact, curl the tail upward. The same sort of thing is true about the numeral 7. Some people will strike the tail downward and slightly to the left. We find that, in the case of numerals, a good place to put an identifying mark for the character area is in the upper left-hand corner, since, with right-handed people, the extended strokes of flourishes do not normally go in that direction. If we made, in some cases, complete rectangular borders for the area in which we write, care in writing is desirable. Particularly so, of course, if the dots are not used as references. In general, it is desirable to use as few area locating marks as possible and to make them as unobtrusive as possible.

While most of the discussion will be centered about handwritten numerals and a few characters, it should be clearly understood that printed characters of a suitable shape and size can be read by the same machinery without any difficulty. In fact, in this case the two dots or the four dots shown by the prior references are not necessary and only a locating mark is required. If the printed characters are made to fill the full size of the field which will be read, the locating marks are not necessary, either. In other words, if the printed character has some black in the upper left-hand corner, and if that is the type of locating mark used for the handwritten characters, the printed character will shift itself correctly in the matrix into appropriate position for reading. The same logic that reads handwritten characters can, of course, read printed characters. If anything, the printed characters will always be easier to read. There is little doubt that in many contemplated uses there will be both printed and handwritten characters, and it is the intention of this specification to describe an invention by which both can be read providing they fulfill the requirements of the system.

An object of my invention is to provide a character reading system for identifying handwritten characters by a reasonably simple machine.

Another object of the invention is to provide an optical scanning reading machine system for characters written around restraint dots or the like.

A further object of the invention is to greatly improve the prior restraint dot systems by the addition of a location mark whose preprinted position with reference to the dots is known. The additional mark makes it practical to construct a reasonably simple optical scanning reader by acting as a control reference for the data processing part of the reader. It further functions as a restraining means, more-or-less depending on the size and shape thereof, to help define the writing area for the writer.

Another object of the invention is to provide a high-speed optical scanning reader for handwritten characters, particularly numerals, which uses a restraint dot system that is greatly improved in the sense that a comparatively simple optical scanning reader can be constructed. An optical reader has many advantages over other readers, such as magnetic. For example, special magnetic ink is not required, and an optical machine is inherently fast.

Other objects and features will become evident in following the description of the illustrated form of the invention which is given by way of example only.

FIGURES 1–1*h* are views showing areas containing characters applied around (or near) guides in the form of pair of vertically spaced dots, and further showing a variety of location marks.

Figure 3:
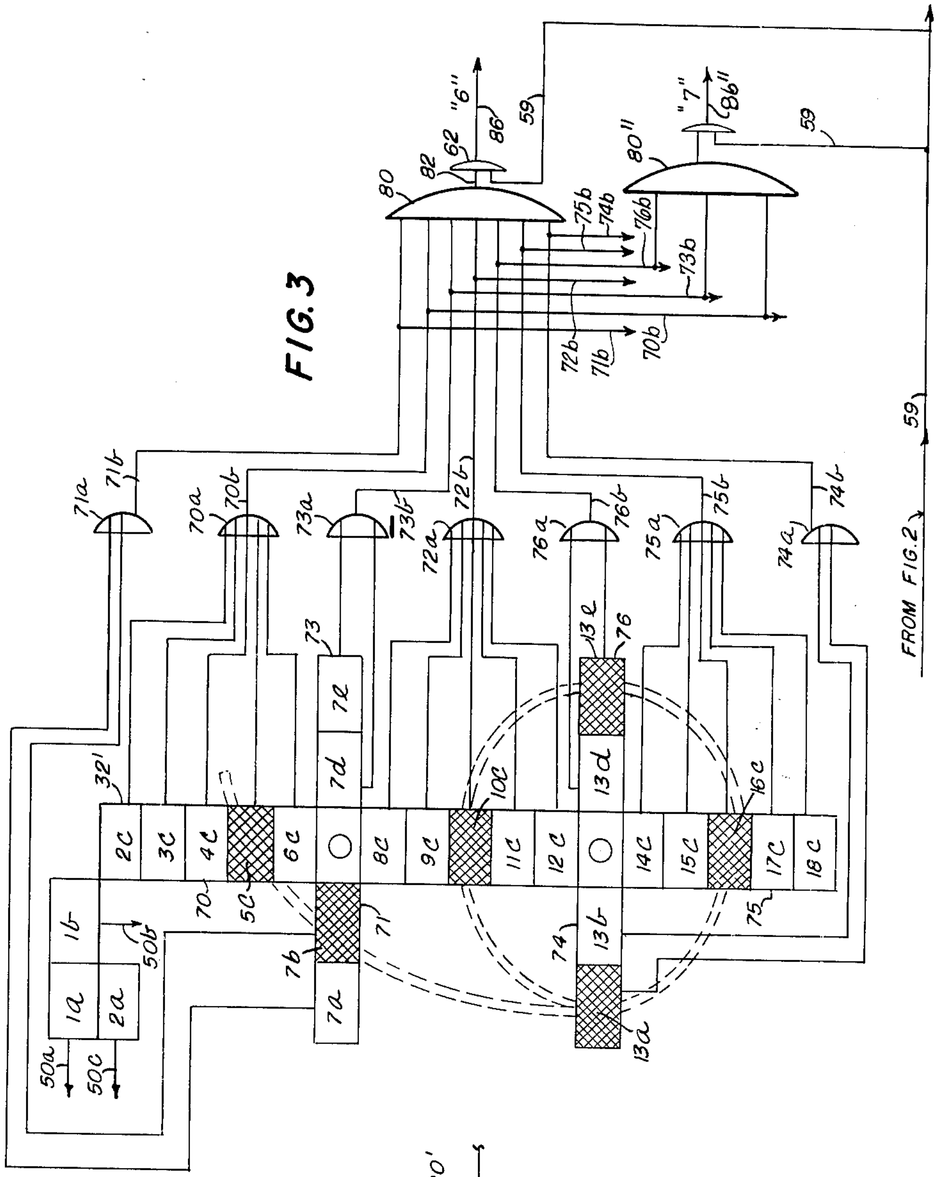
FIGURE 3 is a view showing a portion of the logic circuit of my invention.
Figure 3A:
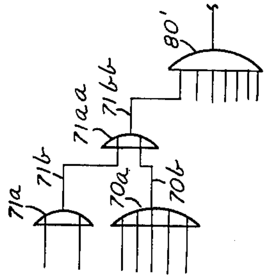

FIGURE 3*a* is a fragmentary view showin a modification of the logic circuit.

Figures 1A, 1B, 1D, 1E, 1F, 1G, 1H, 2:
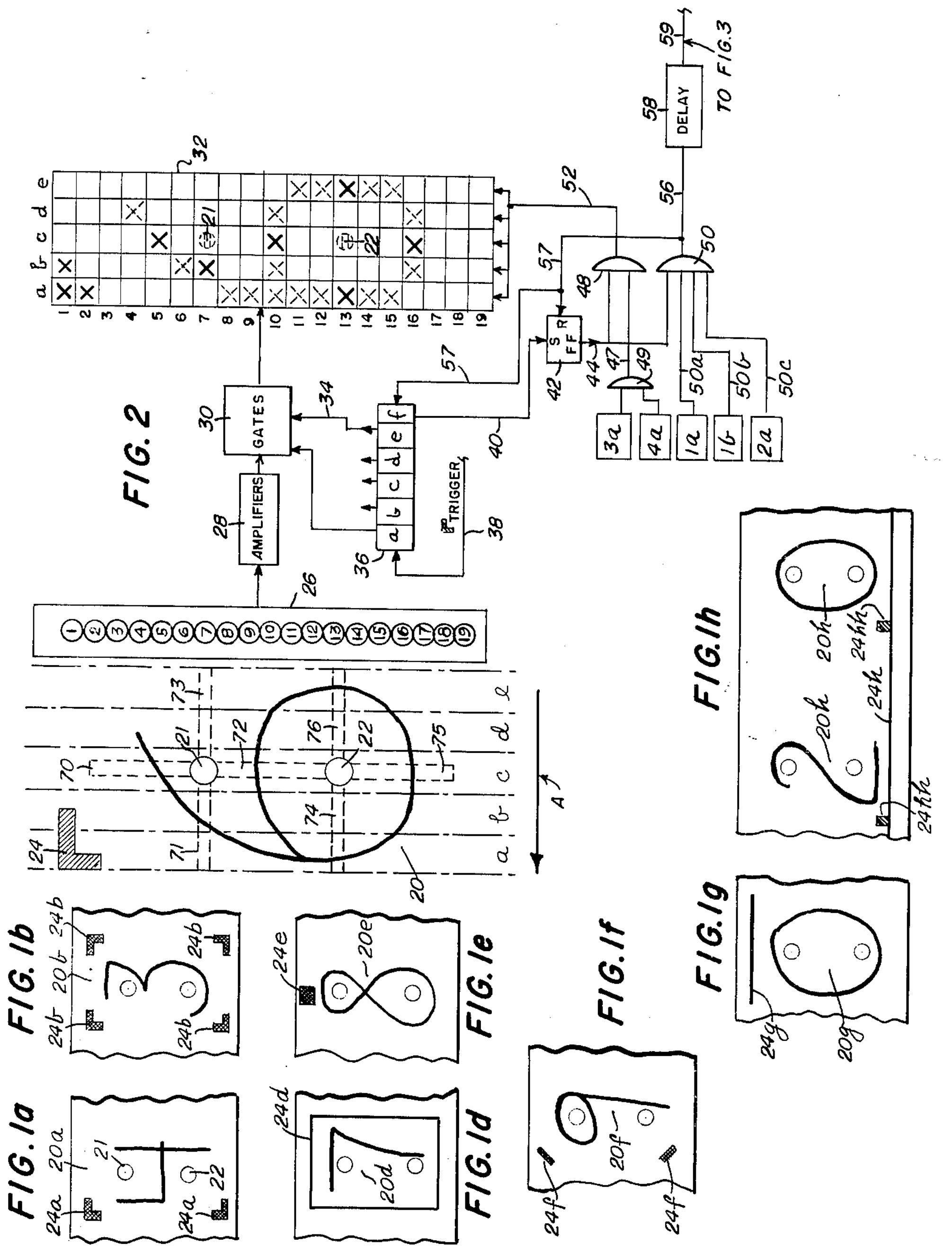
FIGURE 2 is a schematic view showing a reading machine in the process of identifying a six (6) which has the same location mark as FIGURE 1.
Figures 1, 1C:
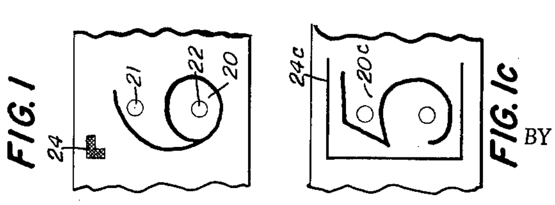

In the accompanying drawing FIGURES 1–1*h* show a number of areas 20–**20*h*, each having a handwritten character. Each area has a handwriting restraint or guide means, for instance a pair of vertically spaced dots 21 and 22 around or near which (in the case of the numeral "1") the writer is requested to apply the character. The purpose of these views is to show a number of differently shaped location marks, 24–24*h*, and to show a variety of places for the marks on the character-background area. The location mark 24 at the left of FIGURE 1 is above and to the left of the dots 21 and 22. This is a good place for mark 24** because there are usually no character tails in this area, as is sometimes the case at the lower and upper right corners. In the next example (FIGURE 1*a*), the location marks **24*a* are at the upper and lower left locations with reference to the dots. The next character area 20*b* has four corner location marks 24*b*. The next two location marks 24*c* and 24*d*** are made of lines, one of which forms a closed box. FIGURES 1*e* and 1*f* show two location marks **24*e* and 24*f*** which are dots and slashes, respectively. FIGURE 1*g* shows mark **24*g*** as an upper horizontal line, while FIGURE 1*h* discloses mark **24*h* as a lower horizontal line. The marks 24*g* and/or 24*h*** may be discrete for each character area (FIGURE 1*g*) or may be continuous to subtend adjacent areas **20*h*** as shown in FIGURE 1*h*. The shape of the location mark or marks is not critical. However, the position, whatever it might be, of the location marks with respect to the pair of dots is important, since it establishes a geometric relationship between the dots and the location mark which materially simplifies the data processing of information gathered by optical scanner 26 (FIGURE 2). I use the mark 24 at the upper left corner of area 20 (FIGURE 2) to describe the principles of my invention, but this is not to be construed as a preference for this mark. The mark **24*d* formed as a "box" or a partial box variation is very well suited for some purposes, e.g., saleschecks, sales slips, catalog order blanks, subscription forms, etc. On the other hand, mark 24*h*** is a more natural mark for the writer since it is customary to write characters on a line such as found on ruled paper.

Scanner 26, like many other components and subassemblies of this invention, may be either identical to or very similar to corresponding components and subassemblies in co-pending application Serial No. 32,911 of J. Rabinow et al. This scanner is made of a vertical row of photocells numbered 1–19 inclusive. Scan motions are obtained by moving the area 20 in the direction of the arrow A while holding the row of photocells stationary or vice versa or combinations of these movements. The individual outputs of the photocells are applied to amplifiers 28 and to AND gates 30 to gate the information gathered by the photocells into a memory 32. The amplifiers 28, gates 30 and memory 32 are similar to corresponding amplifiers, gates and the flip-flop matrix memory made of five vertical shift registers in the Rabinow et al. co-pending application.

Five vertical scans identified *a*–*e* inclusive on area 20 of FIGURE 2 are obtained by shift pulses on line 34 of timing generator 36, gated at 30 with the amplified photocell outputs in order to load the memory 32. More than five scans can be used for greater resolution, but five will show the principle involved. Timing generator 36 is similar to the corresponding generator in the co-pending application and provides pulses for the gates 30 after being triggered by a trigger pulse on line 38. The trigger pulse becomes available when the "first black" is seen by the scanner. The first black in some forms of this invention will be the leading edge located mark, or the sprocket **24*h*′** thereof (FIGURE 1*h*), and the shift signal on line 38 is derived as disclosed in the referenced application. However, the pulse on line 38 can be obtained from the "first black" part of the character (where mark is not seen first by the scanner, FIGURE 1*e*). The information gathered by scanner 24 in the successive scans *a*–*e* is gated into memory 32 and specifically, into corresponding shift register columns *a*–*e* inclusive. So far, with the exception of marks 21, 22 and 24–**24*h*** and their functions, the described machine is similar to the machine disclosed in my co-pending application.

The distinctions between the machine disclosed in FIGURE 2 and the machine disclosed in the co-pending application will now be discussed. These distinctions make it possible to accurately and rapidly identify the handwritten characters with a small amount of equipment. First of all, marker 24 is "seen" by the photocells of scanner 26 whereas, marks 21 and 22 are not in the presently described form of my invention. For instance, the marks 21 and 22 may be red or some other color which the photocells do not separate from the background. It is usually preferred that mark 24 be of the same color as the character, e.g., grey or black, while the background area 20 is white. I have indicated that all of the information obtained by the photocells of scanner 26 is gated into the memory 32. However, for character identification according to the present invention, I use only a part of the information. That part for the numeral "6" is shown by full line X's in the flip-flop matrix memory 32 whereas, information which is discarded is shown by dotted line X's. The actual flip-flops used are those shown in FIGURE 3 as 32′. Upon loading memory 32, it becomes necessary to make certain that the information in the memory is in a known vertical position. This facilitates interrogation of the memory when obtaining information therefrom on which a decision may be made.

Therefore, mark 24 is used for a second purpose. I have arbitrarily selected flip-flops 1*a*, 1*b* and 2*a* as being the preferred position for the mark in the matrix. When location mark 24 is so located (by the setting of flip-flops 1*a*, 1*b* and 2*a* due to photocells 1 and 2 seeing marker 24 during scans *a* and *b*) we know that the marks 21 and 22, if hypothetically superposed on the matrix, would appear at flip-flop positions 7*c* and 13*c* whereby the position of the character information in the matrix 32 would be known.

To assure that the information is correctly located in matrix 32 after the character has been scanned it is shifted up until the marker 24 information reaches the top, i.e., at flip-flop positions 1*a*, 1*b* and 2*a*. These flip-flops are selected by way of example since different shapes and sizes of markers 24 may change the selection of flip-flops. The "up" shift pulse or pulses can be obtained in exactly the same way as described in copending application Serial No. 32,911, or may be obtained by the simple logic circuit shown in FIGURE 2 which operates as follows:

When timing generator 36 steps to the "*f*" position, there is an output on line 40 which sets flip-flop 42. The output thereof, on line 44, is applied as a single input to AND gates 48 and 50, respectively. Gate 48 is also fed by line 47 which is the output of OR gate 49 of the type which provides a chain of output pulses as long as either output is satisfied. Another way to obtain the same result is to use the output of gate 49 to control a multivibrator or blocking oscillator. Flip-flops 4*a* and 3*a* provide the inputs of gate 49. Thus if there is coincidence at AND gate 48 (meaning mark 24 has a part stored at position 3*a* or 4*a* of memory 32) "up" shift pulses occur on line 52 and they are used to shift the information in memory 32 upward until the mark 24 is stored at positions 1*a*, 1*b* and 2*b*. We now develop a "read" signal, as follows: The flip-flops 1*a*, 1*b* and 2*a* have their outputs on lines 50*a*, 50*b* and 50*c* gated at 50 with line 44. Thus, upon coincidence at gate 50, a signal will appear on line 56 which is delayed at 58 and applied over line 59 as one input to a two-input AND gate 62 which develops a "read now" signal. This is described further herein. The signal on line 56 is also fed back over lines 57 to reset flip-flop 42 and timing generator 36.

Obviously, any or any number of flip-flops of memory 32 may be gated at 50 to account for the position of mark 24 in the memory. Further, the number of shift "up" pulses on line 52 will correspond to the location of the flip-flop or flip-flops used to initiate the "up" shifting. If the mark 24 were at the lower part of the area instead of the upper part (as in the case of area 20*h* in FIGURE 1*h*) I would shift "down" to flip-flop positions 19*a* and 19*b*, instead of up. When the mark is a long solid line at the top of an area, for instance mark 24*g* in FIGURE 1*g*, the flip flops at positions 1*a*–1*e* inclusive have their outputs gated at 50 (FIGURE 2). For a lower solid line mark 24*h*, the outputs of flip flops 19*a*–19*e* inclusive would be gated at 50 These selections have the advantage of virtual certainty in shifting the information in the memory 32 to the desired position A practical difficulty which is solved is that of a character having a tail going through the mark 24*g* or 24*h*. In such a case shifting will not stop when the tail reaches the upper or lower horizontal row of flip flops because shifting will not discontinue until all of the flip flops in the upper (for mark 24*g*) or lower (for mark 24*h*) row "see" the mark.

The flip flops of memory 32' (FIGURE 3) are the only flip flops of memory 32 which are actually required for making a decision between characters of a family, for instance handwritten numbers. The selected flip flops form a pattern which is geometrically related to the flip flops 1*a*, 1*b* and 2*a* for mark 24 the same as the dots 21, 22 are related to mark 24 or area 20 in defining a region of area 20 for the writer. The left side of FIGURE 2 shows a pattern in the form of lines hypothetically superposed on area 20 in a form similar to the pattern of flip flops of FIGURE 3. The lines 70, 71, 72 and 73 extend radially from mark 21, with line 72 extending to mark 22, and additional lines 74, 75 and 76 extend radially outwardly from mark 22. Lines 70–76 may be thought of as establishing two sets of X and Y coordinates, although this is not a rigid requirement since, for greater resolution, additional lines may be used. Further, the lines may be broadened or doubled or may have a different configuration and pattern. It will be understood that any flip flops of memory 32 which are not needed, are omitted in practice, but their locations are shown in FIGURE 2 to facilitate understanding of the system.

The actual configuration of the pattern (FIGURE 3) is established by selecting the output wires of flip flops 2*c*–6*c* to form line 70 of the pattern; flip flops 7*a* and 7*b* to define line 71; flip flops 8*c*–12*c* define line 72; and flip flops 7*d* and 7*e* to define line 73. For the lower part of the pattern, line 72 has already been defined, while line 74 is defined by flip flops 13*a* and 13*b*; line 75 by flip flops 14*c*–18*c*; and line 76 by flip flops 13*d* and 13*e*.

Each flip flop of matrix 32 has two output wires, providing "assertions" and "negations" corresponding to whether its photocell in scanner 26 sees "white" or "black." This technique is described in co-pending application Serial No. 32,911, and I make use of it in the logic system disclosed herein.

As used herein, the term "assertion" is defined as a signal received or derived from an elemental area which may or may not contain a portion of a character when that area is being scanned or read, and a portion of the character actually exists in the area and affects the reading machine.

The term "negation" is defined as a signal of the same type as an assertion, but which appears when the elemental area being scanned does not contain a portion of the character. The flip flops of memory 32 are bistable devices with two outputs on wires, and these outputs are either assertions or negations.

The decision aspect of my invention entails the interrogation of the flip flops making up pattern lines 70–76, and a summarization of the information so obtained. Specifically, all flip flops of each line have their assertion wires (or negation wires for some situations) OR gated so that if there has been a character crossing by the scanner (e.g. photocell 7 during scan *b*, setting flip flop 7*b* of line 71), this is recognized. The OR gates are identified at 70*a*–76*a*, and their outputs are on lines 70*b*–76*b*. Summarization is completed (for the character "6") at AND gate 80, producing a signal on line 82 when there is coincidence of all necessary inputs to gate 80.

There is an AND gate corresponding to gate 80 plus an OR gate corresponding to gate 62, for each character of the family, and all AND gates 80, 80' (FIGURE 3*a*) 80'', etc., are fed by some or all of lines 70*b*–76*b* or other lines connected to other memory flip flops or flip flop groupings. The selection of lines is made on the basis of the character in question. Thus, memory 32' is interrogated in parallel by the gate system including the AND gates and OR gates fragmentarily shown in FIGURES 3 and 3*a*, to produce a character identification signal.

For the numeral "6," I select the assertions of pattern lines 70, 71, 72, 74, 75 and 76, together with the negations of pattern line 73, i.e., "not" 73. This means that for AND gate 80 to be satisfied, the scanner 26 must have crossed character lines along pattern lines 70, 71, 72, 74, 75 and 76, and must not have crossed a character line along pattern line 73.

Going further with the numeral "6" (FIGURE 3*a*) suppose that it had been written with an initial vertical stroke so that its upper feature did not cross pattern line 70. This possibility is cared for (FIGURE 3*a*) by OR gate 71*aa* for the outputs of gates 70*a* and 71*a* providing a single line **71*bb* therefrom to gate 80′ in place of lines 70*b* and 71*b*; or by simply not using pattern line 70** as a part of the decision section for the "6." I point this out to show the flexibility of my system in arriving at the optimum configuration of the OR gating for a given family of characters.

For the character "7," I may use OR gates **70*a*, 73*a* (the assertion, rather than the negation as for the character "6") and 76*a* (or 76*a* further OR gated with 75*a*). In such a case the output wires of these gates will form inputs for AND gate 80** for the "7."

Returning now to an earlier part of this description, we will see that a "read" signal is developed on line 56 after the information in memory 32 is shifted to the desired position. Accordingly, decision AND gate 62 will be satisfied when there is coincidence of signals on lines 59 and 82 thereby providing an output signal on the character identification wire 86 for the numeral "6." For the other characters, the procedure is the same, but there will be coincidence at a gate other than gate 80, e.g., gate 80" if the scanned character is "7," to ultimately produce the correct character identifying signal on wire 86″ corresponding to wire 86.

It is understood that the previous description relates to only a few embodiments and alternatives of the principle underlying my invention. Accordingly, the measure of protection of my invention should be governed by the prior art as it applies to the scope of the following claims.

I claim:

1. An optical character reading machine to identify handwritten characters on a surface where at least some of the characters have a tail or flourish which makes the size of the character larger than the average for which the machine is designed, and where there is a constraint mark and a location mark on an area of the surface adjacent to one of said characters, said marks being in a predetermined geometrical position relative to each other, said reading machine having an optical scanner providing outputs pertaining to said character and said location mark, a register responsive to said scanner outputs for storing information concerning said character and said location mark, decision means connected to predetermined portions of said register, and means responsive to the position of the stored information pertaining to said location mark to shift all of the stored information to a predetermined position in said register at which the information concerning the character matches said decision means at its connection with said memory so that the shifting of the stored information is independent of the position of the character-information in the register, thereby enabling the tail or flourish to be neglected in the shifting procedure.

2. The subject matter of claim 1 wherein said decision means is trigger-controlled and means responsive to the stored information pertaining to said location mark, when at a predetermined position in said register to provide a trigger signal for said decision means.

3. The subject matter of claim 2 wherein said means to provide a trigger signal include a logic circuit network arranged to examine a predetermined portion of said register, and means to control the time of effectiveness of said logic network relative to the scanning of the character area.

References Cited by the Examiner

UNITED STATES PATENTS

| | | | |
|---|---|---|---|
| 2,723,308 | 11/55 | Vroom | 340—149 |
| 2,741,312 | 4/56 | Johnson | 340—149 |
| 2,786,400 | 3/57 | Peery | 340—146.3 |
| 2,932,006 | 4/60 | Glauberman | 340—146.3 |
| 2,942,778 | 6/60 | Broido | 235—61.11 |
| 2,964,734 | 12/60 | West | 340—146.3 |
| 2,978,675 | 4/61 | Highleyman | 235—61.11 |
| 3,025,495 | 3/62 | Endres | 340—146.3 |
| 3,108,254 | 10/63 | Dimond | 340—146.3 |
| 3,112,468 | 11/63 | Kamentsky | 340—146.3 |
| 3,123,804 | 11/63 | Kamentsky | 340—146.3 |

MALCOLM A. MORRISON, Primary *Examiner.*

WALTER W. BURNS, Jr., *Examiner.*